Figure 1A:
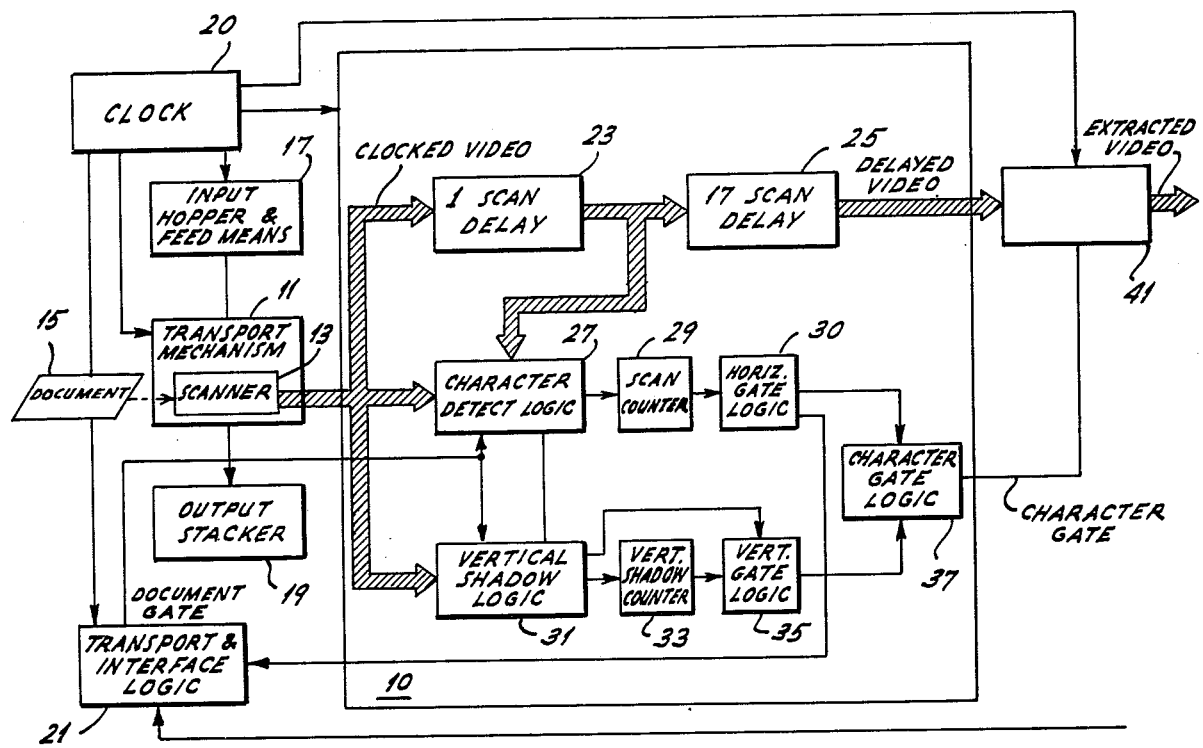

United States Patent [19]

Banz

[11] 4,030,068

[45] June 14, 1977

[54] OPTICAL CHARACTER RECOGNITION SYSTEM

[75] Inventor: D. Michael Banz, Wheaton, Md.

[73] Assignee: Decision Data Computer Corporation, Horsham, Pa.

[22] Filed: Jan. 12, 1976

[21] Appl. No.: 648,298

[52] U.S. Cl. ............ 340/146.3 AQ; 340/146.3 MA
[51] Int. Cl.² .......................................... G06K 9/12
[58] Field of Search .......... 340/146.3 Q, 146.3 AQ, 340/146.3 MA, 146.3 D

[56] References Cited

UNITED STATES PATENTS

| 3,182,290 | 5/1965 | Rabinow | 340/146.3 AQ |
| 3,384,875 | 5/1968 | Bene et al. | 340/146.3 MA |
| 3,576,534 | 4/1971 | Steinberger | 340/146.3 Q |
| 3,829,831 | 8/1974 | Yamamoto et al. | 340/146.3 AQ |
| 3,832,683 | 8/1974 | Nadler et al. | 340/146.3 AQ |
| 3,849,762 | 11/1974 | Fujimoto et al. | 340/146.3 Q |

OTHER PUBLICATIONS

Cutaia, "Multilevel Character Recognition System", IBM Tech. Disclosure Bulletin, vol. 13, No. 12, May 1971, pp. 3739–3742.

Primary Examiner—Leo H. Boudreau
Attorney, Agent, or Firm—Synnestvedt & Lechner

[57] ABSTRACT

An optical character recognition system wherein both feature analysis and matrix analysis operations are performed to insure proper identification of a character under scan. Operating speed and reliability are enhanced by initially classifying the character under scan as being included in a first sub-group of characters having features in common with the character being scanned whereafter final indentification of the unknown character from among the selected sub-group is effected by means of a comparison operation based on a weighted matrix analysis. Preprocessing steps are taken to precisely frame the informational content of the character under scan. The preprocessing steps are effected as the information defining the character is being digitized. Simultaneously therewith the digital information is temporarily stored and, upon completion of the character framing operation, the temporarily stored information is gated into a random access memory (RAM) for use in the further processing operations.

4 Claims, 15 Drawing Figures

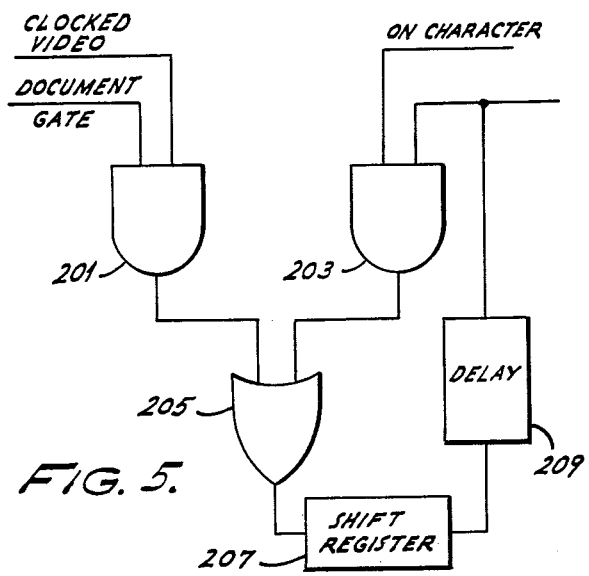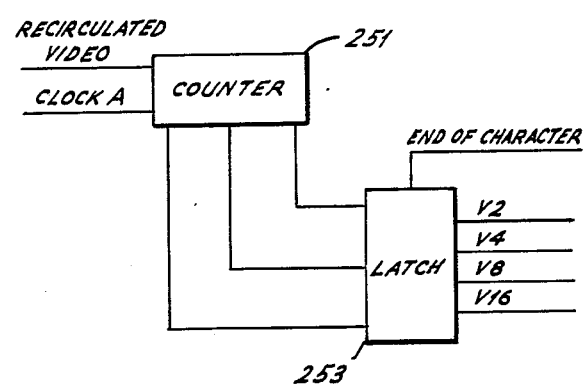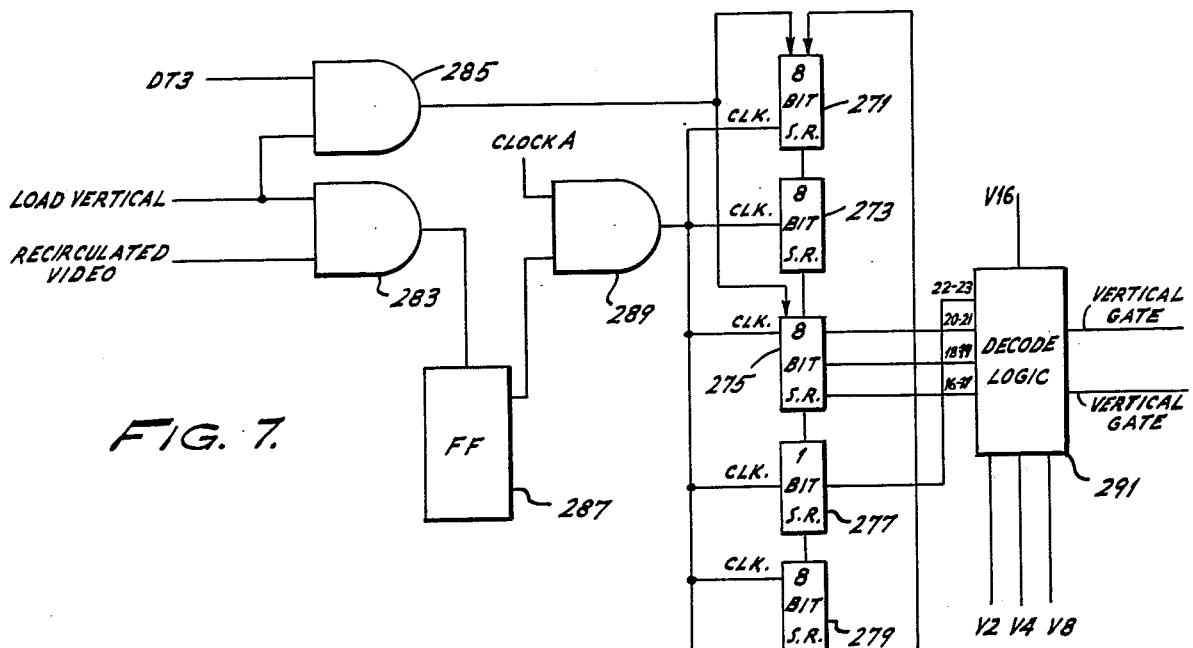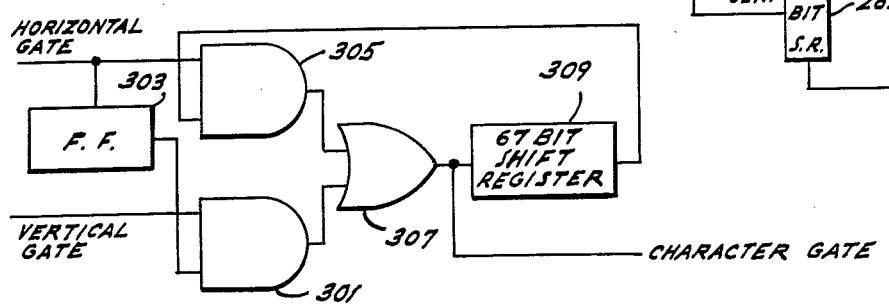

OPTICAL CHARACTER RECOGNITION SYSTEM

BACKGROUND OF THE INVENTION

The present invention relates to an optical character recognition system and particularly an optical character recognition system wherein identification of an unknown character is effected as a result of two philosophically different search techniques. More secifically, after a character to be identified has been properly framed an initial feature analysis step is performed to establish a sub-group of characters most probably inclusive of the unknown character. Thereafter, a matrix analysis of each of the characters comprising the sub-group identified as a result of the feature analysis step is performed wherein a mask of each of the characters comprising the sub-group is compared with the matrix representation of the unknown character. If, as a result of the comparison operation the results acheived with respect to one of the known characters exceeds by a predeterminded factor the results achieved with respect to any of the other characters of the sub-group, the character is deemed to have been correctly identified.

The identification by means of optical character recognition techniques of a single unknown character involving plural successive scanning operations wherein a first comparison operation identifies the unknown character as being contained in a subset of characters whereafter a further more complex comparison operation is effected between the unknown character and each character of the subset, is known. However, with respect to such known techniques, each of the plural searches employed in any one technique have been philosophically the same. Thus, for instance in the patent to Dansac et al, U.S. Pat. No. 3,764,980 and in the patent to Yamamoto et al, U.S. Pat. No. 3,829,831 a gross mask-compare operation to identify a subset of characters is followed by a highly refined mask-compare to effect the final determination of the identity of the unknown character. This is to be contrasted with the approach taken in the present invention wherein the initial feature analysis search effort is followed by a matrix comparison operation.

In the foregoing explanation, as well as in the further portions of this specification, the term "feature analysis" is to be distinguished from the term "matrix analysis" in that in a matrix analysis a one for one comparison of information at any one location is effected for all information points defining a character under scan. The results of a comparison effected at any one information point is entirely independent of the results effected at an immediately adjacent information point. This is to be contrasted with the feature analysis operation which is characterized by the simultaneous interpretation of information at adjacent information points. In the present system both feature analysis operations and matrix analysis operations are performed in the identification of each unknown character. This approach, which basically distinguishes the subject system from the prior art, constitutes a significant advancement in the art and enables the subject system to more accurately and quickly complete the identification of a character under scan.

It should be noted that the prior art optical character recognition systems, including those identified above as utilizing a successive search approach, have been limited to systems wherein the number of candidates (i.e., the plurality of characters comprising the vocabulary, and including the character under scan) is so large that it is otherwise impractical to process the information on a serial basis. Thus, the system disclosed in the Yamamoto patent is indicated as being particularly adapted for use in identifying characters from among all of the known Chinese character patterns, the possible number of which are known to be in the thousands. The basic requirements of such systems are to be contrasted to the present situation wherein the entire character set of the preferred embodiment comprises some sixteen characters. This difference in the magnitude of the possible candidates from among which the unknown character is to be identified is helpful in stressing the basic underlying philosophical differences between the present system and that of the prior art. That is, the prior art approach involves plural comparisons wherein the philosophical basis of the plural comparison operations are the same but wherein a greater degree of refinement is introduced into the second comparison operation.

In contrast, the comparison philosophy of the subject system is such that the initial identification of a character set from which positive identification of an unknown character is to be made is effected by way of a feature analysis operation which establishes a predetermined group of characters from among which the positive identification of the unknown character is made on the basis of a weighted matrix analysis performed on each candidate of the selected subset.

By taking advantage of the large scale integration (LSI) capabilities afforded by presently available integrated circuit technology, once the particular group of potential candidates has been identified the balance of the identification can be readily accomodated by parallel operations simultaneously performed by a processor on all candidates of the selected sub-group.

DESCRIPTION

Figure 1B:
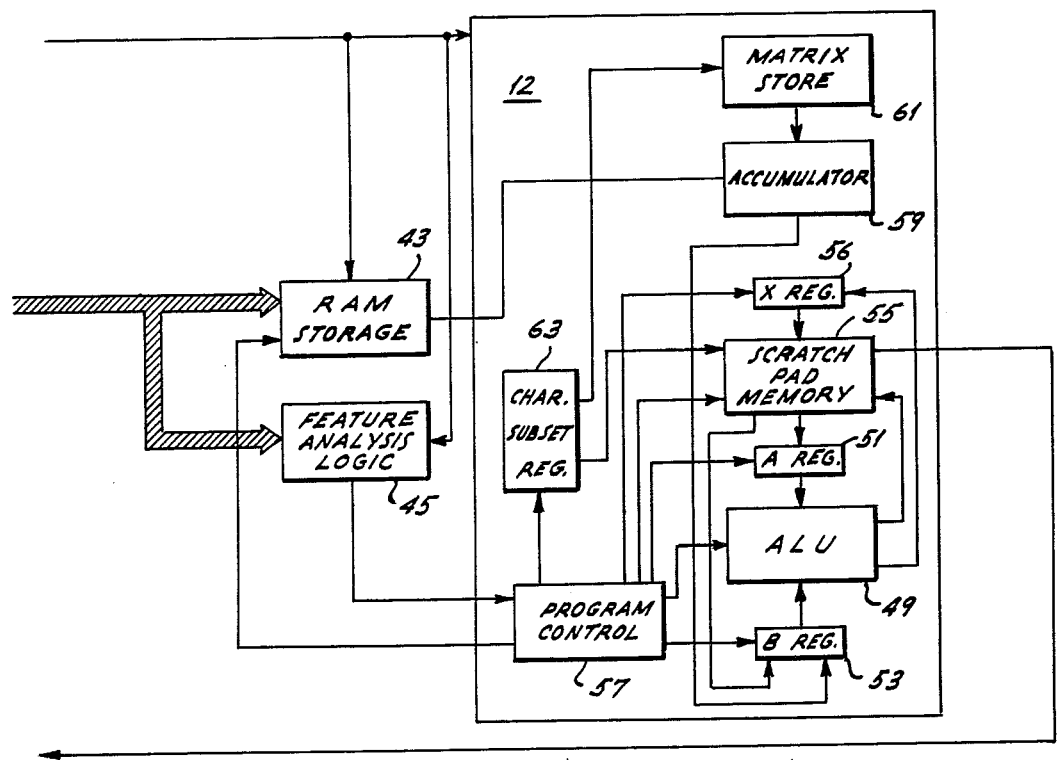

FIGS. 1A and 1B comprise a diagrammatic representation of a character recognition system constructed in accordance with the principles of the present invention. In common with most OCR systems, the subject system may be thought of as comprised of three portions: a transport mechanism; electronic and video recognition components; and, transport and interface control components. Although for purposes of completeness the entire system is disclosed in detail, the primary emphasis will be given to the electronic and video recognition components and associated controls, and the manner in which these components characterize the present invention.

The transport mechanism is divisible into three main areas: the input hopper and feed mechanism, the details of which are shown and described in a co-pending patent application to Derrald M. Banz and Robert E. Springer bearing Ser. No. 581,263 filed May 27, 1975; the transport bed and read head; and, the output stackers. For purposes of this invention it is sufficient to refer to a transport mechanism of conventional design and in this respect, FIG. 1A depicts the transport mechanism generally as member 11 with an associated read head of a scanner 13. A document bearing printed indicia, symbolically represented as member 15, is fed from a hopper (not shown) under the control of hopper and feed control means 17. Documents are transported beneath the read head of scanner 13 by a series of rollers (not shown) and are thereafter electromechanically sorted into an accept stacker, or alternatively a reject stacker, in response to output stacker control means 19.

The character reading and recognition portion of the subject system is divided into four operative sections: the video scanning section; the pre-processing section, wherein the informational content of the character under test is digitized and prepared for storage; the feature extraction portion, wherein the character under test is associated with a particular one of the plural sub-groups of characters which in total comprise the recognizable vocabulary of the subject system; and finally, the recognition processor portion wherein a positive identification of the character under test is effected.

The heart of the video system is a standard Reticon RL64EL optical line scanner. This scanner constitutes an array of 64 photo diodes spaced in line on 5 mil centers. The array is aligned parallel to the bed and vertical with respect to the characters. The array is scanned at a rate of one scan, or frame, per 180 microseconds and the output comprises a train of 67 charge pulses per frame which includes the output from the 64 photo diodes of the Reticon plus three additional housekeeping bits used for the purpose of timing and for separating successive frames.

The timing signals used to control the scanning by the read head, and indeed all other operations performed in the subject OCR unit, are generated by somewhat conventional clocking means comprising a 6 megahertz oscillator depicted as member 20, the output of which is selectively reduced to establish the basic cycle time governing all operations of the OCR system. These timing signals are distributed throughout the system represented in FIGS. 1A and 1B via control leads (not shown).

The third portion of the system, comprising transport and interface logic 21, performing the transport and interface control functions within the present system. In addition to serving as an interface between the transport portion of the subject system and the character recognition portion thereof, member 21 further functions to distribute output signals to other components connected to the system, for example, a card punch mechanism, a computer, etc. A further understanding of the function of member 21 will be apparent from the further explanation of the operation of the subject system which follows.

As part of the preliminary housekeeping chores to be performed in processing a character to be identified, the stream of bits eminating from the read head of the scanner 13 are first amplified, shaped and digitized before being transmitted to the logic circuits for analysis. Conventional shaping systems may be used in this process. The operating requirements of the subject system are such that the character under test, which as an optimum height of 19 bits and an optimum width of 13 frames, may be located anywhere within a scan band of 0.32 inch. Sinch the individual cells of the scanner cover approximately 5 mils, the information bits comprising the characater under scan will be located within 0.095 inches or approximately ⅓ of the scan band.

Since the characters to be recognized can be of varying width and height and can lie anywhere within the 0.32 inch scan band, steps must be taken to reference the useful information portion of the character under test and to discard the redundant video signals. This operation is performed in the character framing logic of the subject system which is diagrammatically shown as comprising those components situated inside the rectangle 10 of FIG. 1A. Although the optimum character side is 13 frames wide by 19 bits high, useful information bits may be found in the first row of bits appearing on all sides of the 13 × 19 bit rectangle. Thus, for scanning and storage purposes 15 frames of video each 21 bits high are stored. The 15 frames of 21 bits each define the boundary of the "character box" within which the information bits defining the character under test must be centered. It is the function of the character framing logic to localize or center the information bits comprising the character under test in the character box.

To localize the character under test, it is necessary to position the character in both the horizontal and vertical reference planes. Since the characters are more or less of constant height but of variable widths it is important to symmetrically position each character within the character box. Horizontal centering, achieved by the timely occurrence of gating pulses based on character width, slices out 15 scans evenly about the character under test. At such, horizontal centering also defines the blank spaces comprising the left and right sides of the character box. Thus, for a character comprising 11 valid frames of information there are 4 frames within the character box which will be devoid of information bits. By dividing the 4 frames so that reside on one side of the frames containing valid video signals and the remaining two on the other side of said frames, the character should be horizontally centered in the character box.

Similar steps are taken to frame the character in the vertical sense. Vertical location is achieved by constructing a "shadow" of the character. This in turn is accomplished by storing information bits in a 67 bit shift register corresponding to locations within said Reticon scanner in which information bits are detected as the character is scanned. Since the information bits are located in the 67 bit shift register without regard to what frames they appear in the character under test the information bits accumulated in the 67 bit shift register define a shadow of the character under test. The shadow in turn is located within the 67 bit shift register in the same relationship as the actual video signals appear in the scan band and thus the number of bits above and below the shadow which must be ignored as redundant video are known.

In further explanation of the operation of the character framing logic, reference is now made to the means disclosed within the rectangle 10 of the FIG. 1A. Since the character framing operation takes place during the initial portion of a scanning operation and prior to any attempt to store off the informational content of the character being scanned for subsequent analysis and indentification, the informational content of a character being scanned is delayed until such time as the character can be completely framed and made ready for storage. Thus, together members 23 and 25 introduce an 18 scan delay between the time information leaves the scanner 13 until it is available for storage preliminary to further processing for purposes of identifying the character under test. Member 23 contributes a one scan delay while member 25 contributes the balance of the 17 scan delay.

After being delayed one scan cycle in member 23, the information bits comprising a video stream of a character under test are also channeled into character detect logic 27 for the purpose of establishing coincidence therein with respect to the information bits in corresponding bit positions of the next succeeding (undelayed) information scan being generated at the output of scanner 13. This serves as a means to avoid false starts as a result of the detection of error signals or noise at the output of scanner 13. Thus, processing of the informational contents of the character under test is delayed until such time as coincidence is detected in corresponding bit locations of two adjacent scans. Thus, the video stream comprising the output of the Reticon is delayed one scan cycle by a conventional shift register comprising the delay mechanism of member 23. Member 27 comprises a comparator wherein corresponding bit positions of the preceding scan stored in member 23 are compared with the current output of the scanner 13.

In addition to serving to detect the presence of information bits in corresponding bit locations of two successive scans, the character detect logic of member 27 also serves to generate signals for detecting the width of the character under scan. To better understand the function served by the character detect logic 27, reference is made to FIG. 2 wherein are disclosed the details of the logic of member 27. Therein are depicted three AND gates 131, 133, and 135. AND gate 131 is conditioned upon receipt of a ONE SCAN DELAY signal from the output of the delay mechanism 23 together with a CLOCKED VIDEO signal from scanner 13. AND gate 131 is conditioned in response to the detection of information bits in corresponding bit locations of two successive frames of a character under test. It is AND gate 131 which establishes the horizontal standard that information bits be located in two corresponding bit locations of successive scans in order to initiate a cycle of operation of the Optical Character Recognition System. Even so, the failure to register information in a predetermined number of succeeding scans will effect an automatic reject of the information under scan. Further explanation of this latter feature is set out below and in conjunction with the explanation of the horizontal gate logic.

The output of AND gate 131 together with the output of AND gates 133 AND 135 are ORed through gate 137 the output of which in turn conditions AND gate 139 whenever a DOCUMENT GATE signal is present indicating that a document is currently under test. The output of AND gate 139 is used to set a flip-flop 141 the output of which toggles an on character flip-flop 143. The flip-flops 141 and 143 are controlled by different ones of the three housekeeping bits, DT1, DT2, and DT3, which characterize the end of each scan cycle. The relative occurrence of these housekeeping bits is such that the on character flip-flop 143 will be set and remain set unless all of the conditions for satisfying one or another of the gates 131, 133, and 135 are not present during any one frame.

AND gate 133 is satisified between the second and eleventh frame whenever an information bit appears in a particular frame. It will be noted from FIG. 2 that AND gate 133 is in part responsive to a signal ON CHARACTER indicating that flip-flop 143 is still in its set state indicating that information bits have been detected in the immediately preceding scan.

AND gate 135 is conditioned upon detection of information bits in corresponding bit locations of two successive scans after a count of 11 scans has been registered.

It should be noted from the above that the on character flip-flop 143 becomes set and remains set until the completion of the processing of a character under test. During successive scan cycles while the on character flip-flop remains set the informational content thereof is used to toggle a scan counter depicted as member 29 in FIG. 1A. The scan counter 29 comprises a five bit binary counter of conventional design, but which is only capable of recording counts up to 16. The counts stored in the scan counter 29 correspond to the number of successive scans in which information bits are detected.

Figure 3:
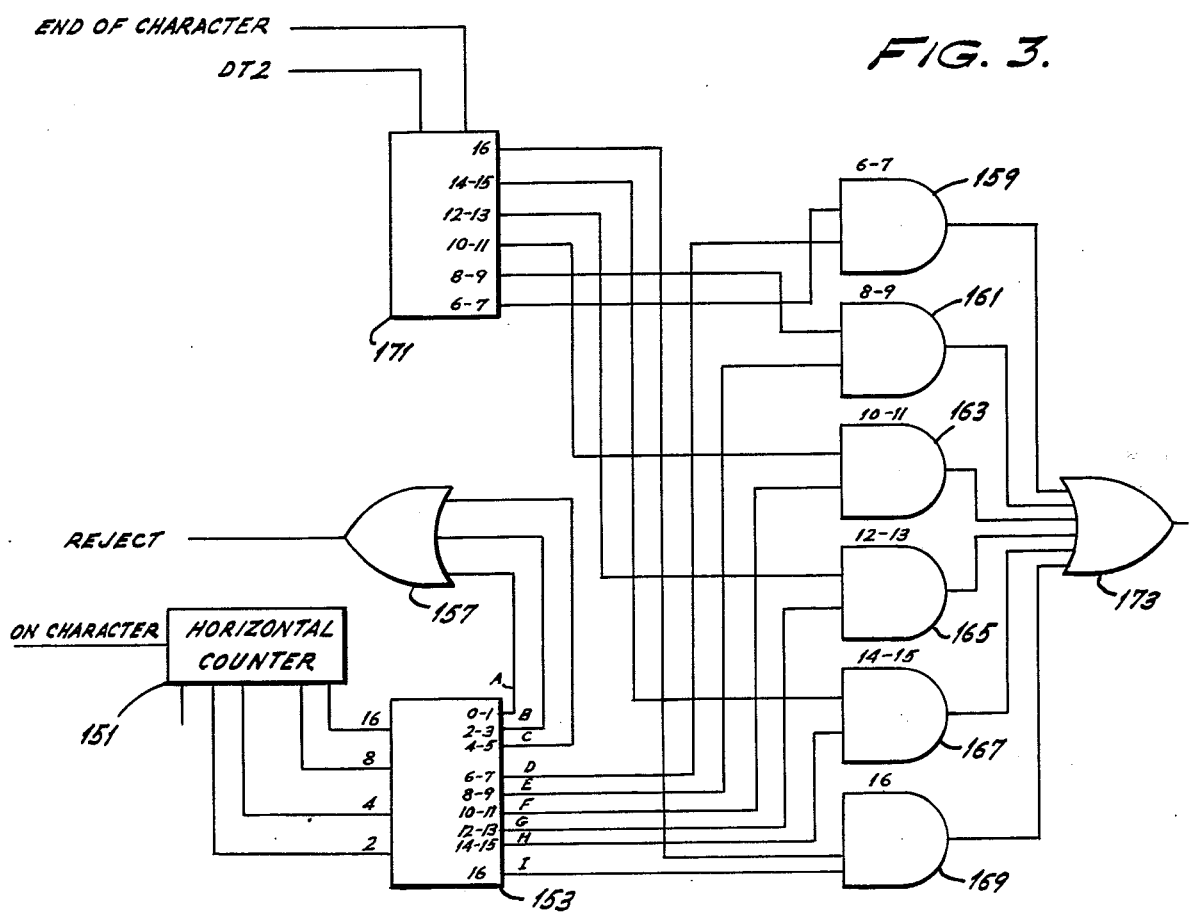

The contents of the scan counter are decoded in what constitutes horizontal centering logic the details of which are depicted in FIG. 3. Turning now to FIG. 3 therein disclosed is the logic for horizontally centering the information content of the character under scan in the "character box".

Figure 2:
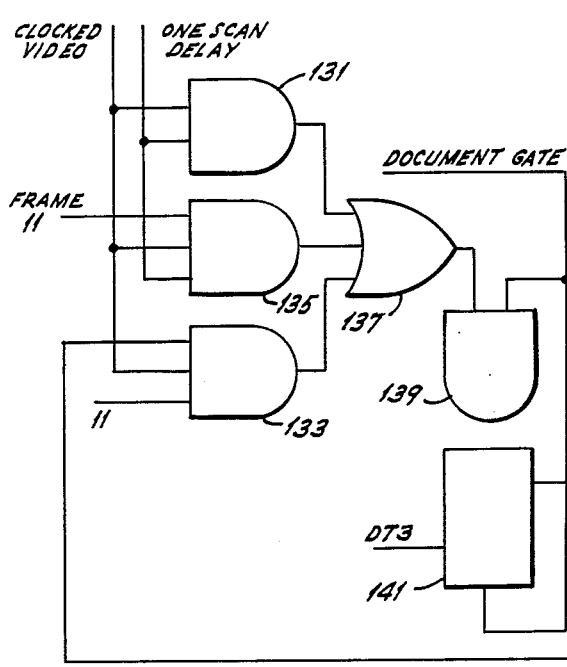

As indicated above, the horizontal counter 151 is connected to the output of the on character flip-flop 143 of FIG. 2. While on character flip-flop 143 is set, the number of frames is recorded in the horizontal counter 151 which in turn registers at its output a count corresponding to the number of successive frames in which information bits are registered. The output of the horizontal counter 151 comprise a binary representation of the contents thereof. This binary representation is converted in a decoder 153 into a single signal appearing on any one of a plurality of outputs from the decoder, each of said outputs representing two values of the count stored in the horizontal counter 151. Thus, as indicated in FIG. 3, the output on line 155A represents a count of either 0 or 1, the output on line 155B indicates a count of either 2 or 3, the output on line 155C indicates a count of 4 or 5. Similarly, lines 155D, E, F, G, H, and I represent a correspondingly increased count through 16.

In the preferred embodiment of the present invention if a count of 5 or less is registered in the horizontal counterthe character under test is rejected as being too narrow Monitoring the width of a character under test is an important consideration since width, at least partially, determines whether or not there is sufficient information in the character under test to enable it to be correctly identified. For purposes of effecting the rejection of a character as being too narrow, the output on leads 155A through 155C are buffered through a gate 157 the output of which in essence constitutes a REJECT pulse used to signal the transport logic.

The balance of the output leads from decoder 153 are connected as conditioning leads to a plurality of AND gates 159, 161, 163, 165, 167, and 169. These gates are further conditioned by the output of a shift register 171. The shift register 171 is activated by an END OF CHARACTER signal which in turn is generated a predetermined time after the last frame containing information bits has been scanned. The signal reflecting the detection of an END OF CHARACTER is introduced into shift register 171 and is shifted therethrough during successive scan cycles in such a manner that it activates output signals which in turn constitute conditioning signals to the AND gates 159 through 169. The output of AND gates 159 through 169 are buffered through OR gate 173.

The exact function and mode of operation of the logic of FIG. 3 and the role played by the output signals therefrom in the further processing of the information through the subject character recognition system will become more apparent from an explanation of the corresponding vertical centering logic, However, at this point note that the horizontal counter 151 contains a character width measurement the binary output of which feeds the decoder 153. Effectively, decoder 153 translates the binary input to a decimal output giving a singular indication of the character width. This indication, as such, subsequently controls the timely appearance of the output of OR gate 173 and effects the initiation of HORIZONTAL GATE signal to coincide with the appearance of the character under test in the DELAYED VIDEO signal emerging form 17 scan delay 25 and provide for its extraction. However, as will be explained below, VERTICAL GATE combines with HORIZONTAL GATE to develop CHARACTER GATE which performs the extraction of the information bits from the character under test from the DELAYED VIDEO signal.

Figure 4:
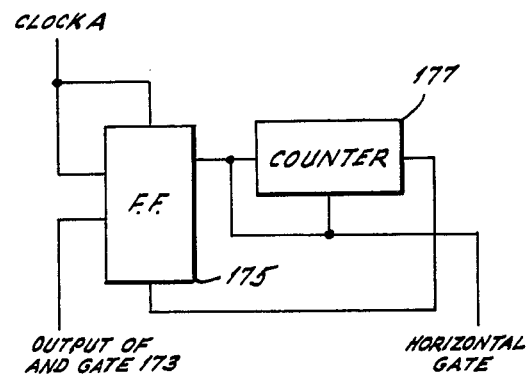

Turning now to FIG. 4, therein disclosed is the logic for effecting the generation of the HORIZONTAL GATE signal. The output of the OR gate 173 of FIG. 3 is inputed into a flip-flop 175 the output of which constitutes a pulse equal in duration to 15 scans which serves as an input to the character gate logic of member 37 of FIG. 1A as hereinafter disclosed. Once HORIZONTAL GATE signal is activated by the output of OR gate 173, flip-flop 175 allows counter 177 to count 15 scans before deactivating the HORIZONTAL GATE signal.

In addition to cycling the scan counter 29 of FIG. 1A, the output of the character detect logic 27 also serves to condition vertical shadow logic 31 wherein a shadow of the character under test is developed through successive scanning cycles to thereby generate an exact measure of the height of the character and also to establish the position of the character within the total scan band. As indicated above, the scan band comprises some 64 character bits whereas the vertical height of each character is normalized to 21 bits.

The details of the vertical shadow logic 31 of FIG. 1A are shown in FIG. 5. It is the function of the logic of FIG. 5 to provide a synchronized recirculating shift register wherein the 64 information bits developed in any one scan are supplemented by the three housekeeping bits, DT1, DT2, and DT3, so as to form a train of 67bit locations which are continuously supplemented with information bits developed as successive frames are scanned. In this manner a shadow of the vertical profile of the character under test is developed.

As shown in FIG. 5, the CLOCKED VIDEO signal from the scanner 13 of FIG. 1A appears at the input to an AND gate 201. The presence of a DOCUMENT GATE signal generated in the transport logic 21 of FIG. 1A completes the conditioning of AND gate 201 allowing the information signal comprising the CLOCKED VIDEO to be buffered through OR gate 205 into a 64 bit shift register 207 the output of which is further delayed in a 3 bit shift register 209 to allow for the addition of the three housekeeping bits. The output from member 209 is further inputed into AND gate 203 which is further conditioned by the presence of an ON CHARACTER signal. During each cycle of recirculation following the detection of information in a scan for which the on character flip-flop of FIG. 2 remains set the information derived from each succeeding scan is added to the information already recirculating in the logic of FIG. 5. As a result, the information ultimately appearing in the recirculation register comprises a solid band of information bits occupying a total number of bit locations corresponding to the height of the character under test. The relative position of the information within the shift register 209 when combined with HORIZONTAL GATE at character gate logic 37 further defines the relative position of the character within the scan band.

After being accumulated in the recirculating logic of FIG. 5, the information bits comprising the vertical shadow of the character under test are transferred into a second recirculating storage register (not shown) for temporary storage. This occurs upon the generation of an END OF CHARACTER signal. This second stage recirculation register is identical to that disclosed in FIG. 5 except for the conditioning signals to the equivalent of AND gates 210 and 203.

In addition to being stored off in the second recirculating register the information comprising the vertical shadow of the character under test is also transferred into a vertical shadow counter depicted as member 33 in FIG. 1A, wherein a count of the character height is recorded. This information is later used to normalize the character height to a standard 21 bit as will become apparent from a discussion of the vertical shadow counter given below in conjunction with an explanation of the vertical gate logic depicted in FIG. 1A as member 35.

Referring now to FIG. 6 therein is disclosed a binary counter responsive to signals generated at the output of the delay member 209. During the processing of the CLOCKED VIDEO signal, a counter 251 increments, from zero, for each bit of the developing vertical shadow signal as each new scan assimilates into the vertical shadow signal. Upon the assimilation of the last scan, END OF CHARACTER signal stores the count registered in counter 251 (vertical height information) into a latch 253. The output of latch 253 is subsequently used to condition gating circuitry associated with the vertical gate logic of FIG. 7 discussed hereinbelow.

After the vertical shadow of the character under test has been developed and stored in the second of the recirculating registers comprising the vertical shadow logic 31 of FIG. 1A, the information bits defining the vertical shadow are used to trigger an output from a preset recirculation register which output defines the relative position of the vertical shadow in the scan band. It should be noted that in the subject system there is no need to establish, through a system of coordinates or otherwise, the starting and ending position of the information bits defining the vertical shadow. Rather, use is made of the fact that the information bits defining the vertical shadow are already synchornized with respect to the 67 scan bits. The relative position within a scan of the first and last bit positions comprising the vertical shadow are used to define the information boundaries of the character under test during the subsequent storage of the delayed information bits in the processing portion of the subject system. It will also be recalled from the earlier discussion that the vertical height of each character will also vary; accordingly, it is necessary to normalize the character height to 21 information bits. It is the function of the vertical gate logic of FIG. 7 to extract the necessary information from the vertical centering logic of member 10 to enable the generation of the necessary gating signals to accommodate both of the above functions.

Referring now to FIG. 7, therein is disclosed the details of the vertical gate logic 35, comprising a multi-stage, preset, recirculating shift register consisting of the members 271, 273, 275, 277, 279, 281, and 283. The respective stages of the recirculating shift register are preset; however, shifting of the information bits therein is delayed until the vertical shadow has been released in response to the generation of a LOAD VERTICAL signal. The LOAD VERTICAL signal serves as a conditioning input to AND gates 283 and 285. AND gate 283 is further conditioned by the RE-CIRCULATING VIDEO signal comprising the information bits which define the vertical shadow. Until this point in time these information bits are recirculating in the second stage of the vertical shadow logic 31. Upon occurrence of the LOAD VERTICAL signal an output from the AND gate 283 sets a flip-flop 287 which in turn partially conditions AND gate 289 such that the latter is responsive to the next clocking signal. This in turn conditions the respective stages of the recirculating shift register 271–283 such that the preset representation stored therein will commence to shift through the respective stages of said shift register causing the VERTICAL GATE signal at the output of decode logic 291 to go high and remain high during 21 of the 67 bit positions which define a single scan. Decode logic 291 is conditioned by the output of the vertical shadow counter 33 of FIG. 6 so as to compensate for variations in the character height.

Having now defined the starting and ending location of the information bits in the vertical scan band and having further centered the character in the horizontal plane, there remains but to combine these two information states and generate an output signal therefrom which may be used to gate the DELAYED VIDEO into the processor portion of the subject system. This is the function of the character gate logic of member 37 of FIG. 1A, the details of which are disclosed more completely in FIG. 8. The character gate logic comprises a 67 bit recirculation register with appropriate input gating circuitry conditioned by the output of the horizontal gate logic 30 and the output of the vertical gate logic 35 to produce a series of 15 signals each comprising 21 bits of the 67 bit output of the recirculation register. Each of the 21 bit information signals is synchronously positioned within the scan cycle so as to correspond with the information bearing portion of the DELAYED VIDEO signal. This means that the DELAYED VIDEO will be selectively gated into the 315 bit positions which define the random access memory used in conjunction with the processing portion of the subject system. The 315 bit positions in turn comprise the 21 bits of information developed in each of 15 scans.

Turning now to FIG. 8, therein are disclosed the detailed logic components for generating the CHARACTER GATE signal. A first AND gate 301 is partially conditioned by the vertical gate output signals from the circuitry of FIG. 7. The balance of the conditioning signals to AND gate 301 constitutes the output of a flip-flop 303 which is set by a HORIZONTAL GATE signal from the horizontal gate logic of FIG. 4. The HORIZONTAL GATE signal is also used to partially condition AND gate 305. The output of AND gate 301 and 305 are buffered through an OR gate 307 the output of which goes to a 67 bit shift register 309. The output of the 67 bit shift register 309 feeds back to its input by the conditioning action of HORIZONTAL GATE on AND gate 305. This conditioning of AND gate 305 persists for 15 scans, each scan being some 21 information bit periods in duration. The CHARACTER GATE signal, hence, is the resultant signal.

In summarizing the operation to this point in time, it should be noted that for each document passing the scanner 13 the informational content of each character sensed is digitized by the Redicon line scanner into some 15 scans comprising 64 information bits to which are added 3 housekeeping bits per scan. The detection of information bits in corresponding bit locations of two successive scans establishes the presence of a character under test. This in turn initiates the character framing operation wherein the information bits are centered in a character box of some 21 bits by 15 scans. For purposes of preserving the informational content of the character under scan for further analysis and identification, the first frame found to contain information bits, together with the next succeeding 17 frames of output signals from the scanner 13, are stored in a delay mechanism, the output of which is called DELAYED VIDEO, while the character framing signals are developed.

As a result of the character framing step, gating signals are developed which allow the extraction of information bits comprising the character under test from the DELAYED VIDEO signal. It is the function of the character gate logic 37 of FIG. 1A to generate gating signals which are synchronized with the character under test of DELAYED VIDEO signal. The output of the character gate logic 37 are the CHARACTER GATE signals which appear as a stream of 15 gating pulses each equal to the time duration of 21 information bits. The specific circuitry for generating the CHARACTER GATE signals has been disclosed above as FIG. 8.

The stream of CHARACTER GATE signals is combined in member 41 with the DELAYED VIDEO signals, and affords the means for restrictively scanning the information comprising the DELAYED VIDEO signals simultaneous with the transfer of the informational content of the character under test into a random access memory (RAM) 43. The output of member 41 comprises a strem of information bits hereinafter referred to as EXTRACTED VIDEO.

In addition to being transferred into the random access memory 43, the EXTRACTED VIDEO signals are also inputed into feature analysis logic depicted as member 45 of FIG. 1B. It will be recalled from the foregoing discussions that the function of the feature analysis logic is to identify a predetermined subgroup of characters having features in common with those of the character under test.

In feature analysis, the character box is effectively subdivided into areas and these areas are selectively explored so as to establish the presence of a pre-determined number of information bits at locations therein which if present will, in combination with the results of a similar anaylsis at other select areas, establish the identity of a subgroup of characters most probably inclusive of the character under test. Features which may be used to identify a subgroup of characters include: wide middle (WM); black lower left (BLL); medium bottom (MB); three crossings vertical (3XV); vertical lower left (VLL); black center (BC); vertical lower right (VLR); and, right upper diagonal (RUD). In the preferred embodiment of the present invention, the last four of these features are used to conclusively establish the subgroup to which the character under test belongs. In a more expanded vocabulary, other of the above mentioned features may be used or alternative features may be defined.

It should be understood that the feature analysis operation occurs simultaneous with the storage of the information into the random access memory 43 and the results of the feature analysis are available at the completion of the storage operation so that no further delay in processing is incurred as a result of the feature analysis step. The immediate benefit of such an arrangement is apparent since the feature analysis step is accomplished at the expense of hardware only and no time is lost in the further processing. At the same time, the feature analysis step makes possible a significant reduction in the further processing of all possible candidates; in the preferred embodiment of the present invention this amounts to a reduction of from 16 to 5 characters. This reduction makes it feasible to effect the simultaneous processing of the masks of all 5 possible candidates with the information bits of the character under test stored in the random access memory 45 and thus further enhances the operating speed of the subject system.

Figure 9:
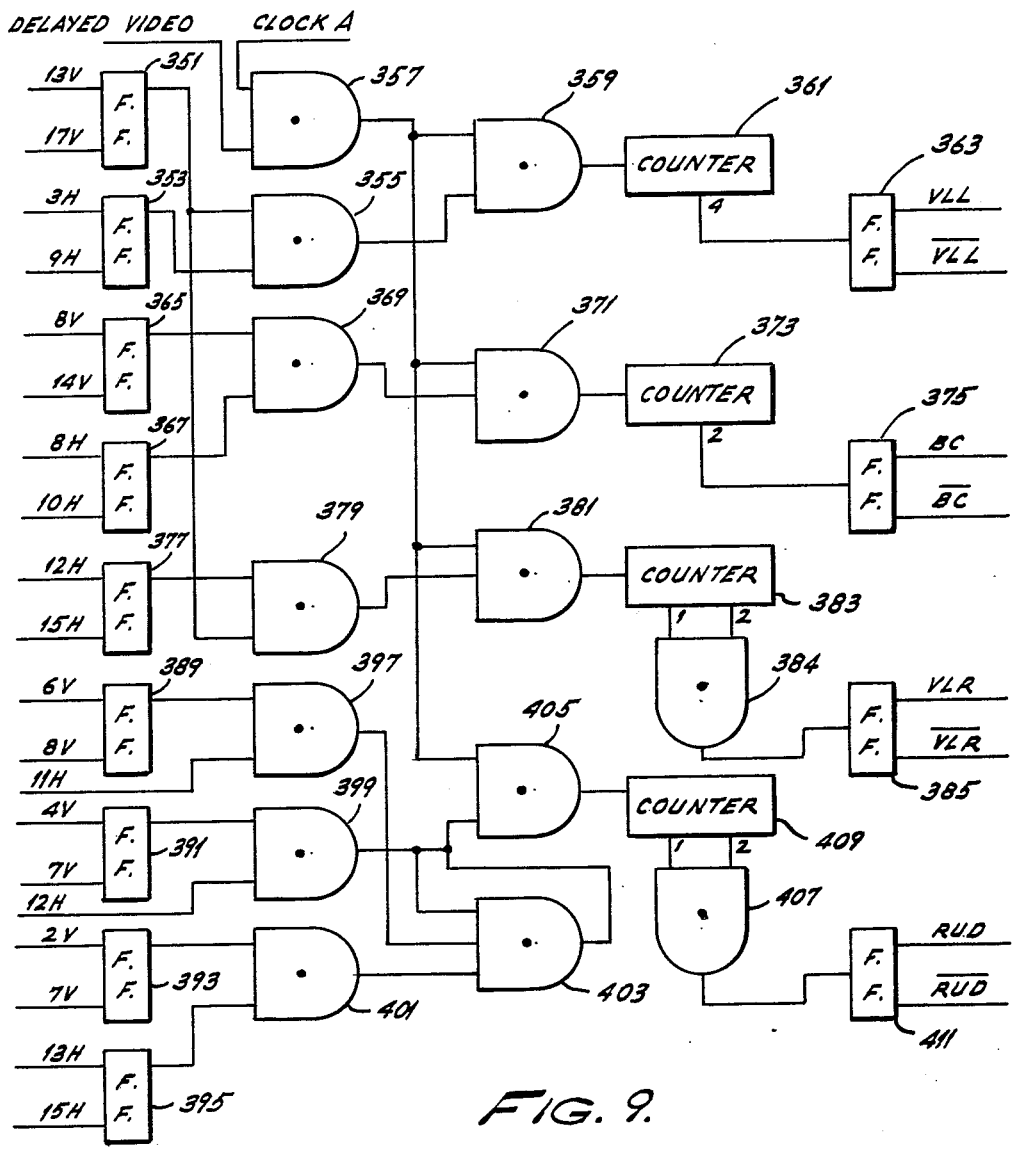

The logic for implementing the feature analysis operation is disclosed in FIG. 9 in reference to which consideration is initially given to the upper portion thereof wherein two flip-flops 351 and 353 are shown. Flip-flop 351 is conditioned to be set in response to the leading edge of the thirteenth vertical bit and is reset by the leading edge of the seventeenth vertical bit. These and all further related conditioning signals to the feature analysis logic of FIG. 9 are derived from the signals comprising the EXTRACTED VIDEO at the times determined by the counters of FIG. 8. The second flip-flop 353 is conditioned to be set in response to the leading edge of the third horizontal scan and is reset by the leading edge of the ninth horizontal scan. The outputs of the aforementioned flip-flops 351 and 353 are independently connected to condition an AND gate 355, the output of which is further combined with the output of AND gate 357, the latter in turn being conditioned by a clocking signal together with information bits of the DELAYED VIDEO signal. The output of AND gates 355 and 357 are combined in AND gate 359 which goes high upon detection of information bits in the scan band comprising the thirteenth through sixteenth vertical positions of horizontal scans three through eight. Each time AND gate 359 goes high a pulse is gated into a counter 361 which in turn generates a useful output signal in the event that a count of eight is reached during any one operative cycle. An output from the counter 361 is effective in setting a flip-flop 363 which remains set through the balance of an operative cycle and indicates the presence of a significant number of information bits in the vertical lower left quadrant of the matrix field within which the information bits comprising the unknown character are defined. Accordingly, the output of AND gate 363 is denoted as vertical lower left (VLL).

Somewhat similarly, logic, comprising two flip-flops 365 and 367, AND gates 357, 369, and 371, counter 373 and flip-flop 375, functions to determine the existence of a black center (BC) in a character being scanned. For this purpose, the eighth vertical bit position of horizontal scans eight and nine are sensed to determine the existence of at least three black bits. In the event this condition is satisfied, an output signal is generated in the counter 373, which output signal sets the flip-flop 375 such that a signal BC appears on the output thereof.

A vertical lower right (VLR) signal is developed on the logic comprising flip-flop 377, AND gates 357, 379 and 381, counter 383, ANd gate 384, and flip-flop 385, if a count of three is registered by the informational content contained within vertical scans thirteen through sixteen and horizontal scans twelve through fourteen.

It addition to being able to respond to a predetermined number of counts within a rectangular field, the subject system is designed to more sensitively respond to curves in the character under analysis by selectively combining the outputs from plural gating devices each of which is responsive to the presence of information in a more limited segment of the matrix of information defining the character under scan. For example logic comprising flip-flops 389, 391, 393, and 395 togehter AND gates 397, 399, 401, 403, 405, and 407, counter 409 and flip-flop 411 together with their respective gating signals, function detect a condition which may be defined as right upper diagonal (RUD). More specifically, information is first sampled in the sixth and seventh vertical bit positions of the eleventh horizontal scan by AND gate 397. This iformation is combined in AND gate 403 with information sensed in the fourth through sixth vertical bit positions of the twelfth horizontal scan as sampled by AND gate 401. Information is also sensed in the second through sixth vertical bit positions of the thirteenth and fourteenth horizontal scans by AND gate 401 and its further combined in AND gate 403 with the outputs of AND gates 397 and 399. In accordance with the balance of the logic depicted in FIG. 9, flip-flop 411 is set if a total of three black bits are detected in the aforementioned scan areas.

Figure 10:
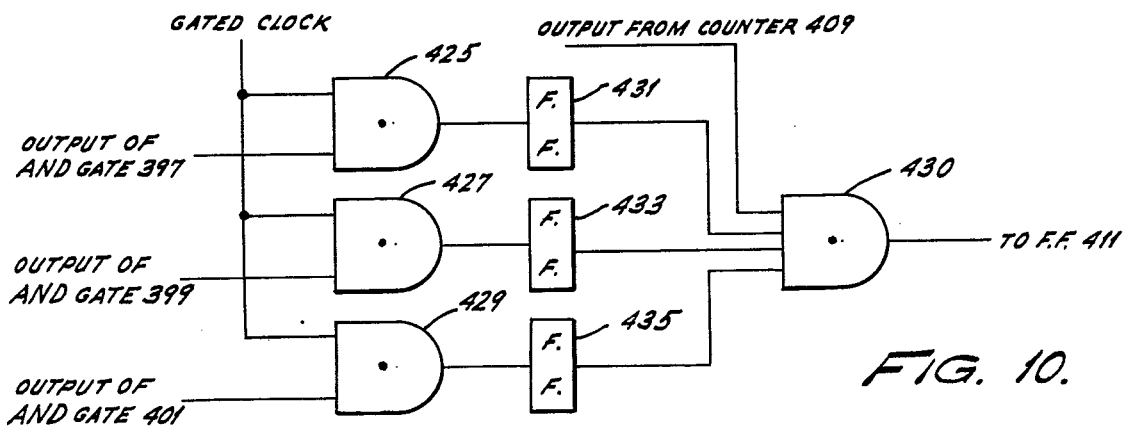

It is also possible by a slight redesign of the aforementioned combinatorial logic to impose stricter response standards. Thus, in addition to the three bits of black information which were required to be detected by the aforementioned logic, the addition of four more AND gates such as are depicted as AND gates 425, 427, and 429 and 430 of FIG. 10, plus three flip-flops 431, 433 and 435 would make it possible to demand that at least one bit of information be generated in response to each sub-segment tested. Thus, for the logic depicted in FIG. 10 the additional requirement would be imposed that at least one black bit be located in the scan area comprising the sixth through seventh vertical bit positions of the eleventh scan, at least one black bit be detected in the bit positions four through six of the twelfth scan and at least one black bit be detected in the bit positions two through six of the thirteenth and fourteenth scan.

Figure 11:
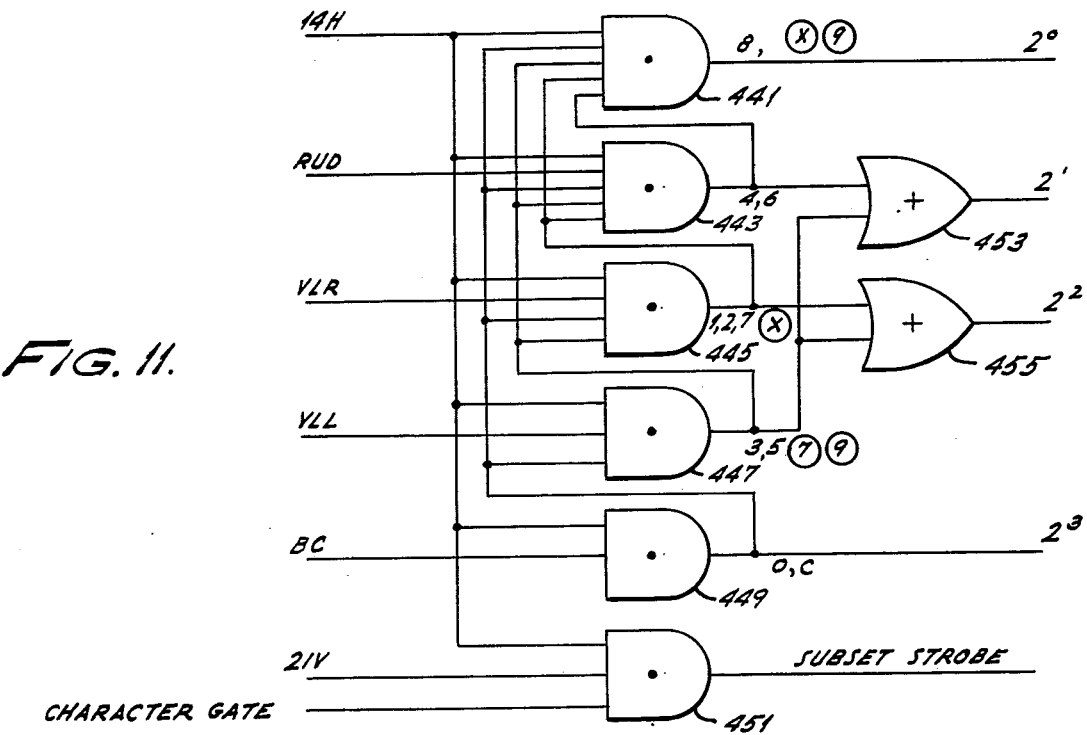

After the informational content of the delayed video signal has been analyzed by the feature analysis logic 45 and the appropriate indicators generated by the associated logic i.e., at the outputs of the flip-flops 363, 375, 385, and 411, depicting respectively a vertical lower left condition (VLL) or not; a black center condition (BC) or not; a vertical lower right condition (VLR) or not; and a right upper diagonal condition (RUD) or not, this information is combined in a logic tree network in the nature of that disclosed in FIG. 11 as a result of which a particular sub-set of characters is identified from whence a final determination will be made of the particular character under scan.

With reference to FIG. 11, therein is disclosed a plurality of AND gates 441, 443, 445, 447, 449, and 451 which function together with OR gates 453 and 455 to provide a code appearing on the four output leads $2^0$, $2^1$, $2^2$, $2^4$. The code identifies the particular subgroup of characters to which the character under test belongs. Also present is an output signal SUBSET STROBE from AND gate 451 denoting completion of the feature analysis operation.

It will be noted that during the fourteenth frame gating or conditioning signals will commence to be transferred to the input of the plurality of AND gates 441, 443, 445, 447, 449, and 451. These AND gates are further selectively conditioned by the outputs of the feature detector logic i.e., VLL, BC, VLR or RUD. In the preferred embodiment of the present invention negative logic is used. Therein a BLACK CENTER NOT signal is gated through the inverting AND gate 449 to establish an output signal indicative of the fact that the character under test contains a black center. The BC feature is used in the identification of a subgroup of characters comprising the number 0 and the letter C. the other features are similarly used to effect the selection of an appropriate subgroup of characters, this occurring by means of a subgroup probe signal initiated upon generation of the output signal 21V of the fourteenth frame.

Having now traced the operation of the subject Character Recognition System through the storage of the selectively excerpted delayed information bits comprising the character under test and the simultaneous identification through the feature analysis of the sub-group of characters to which the character under test most probably belongs, there remains for discussion the processor portion of the subject system wherein the identification of the character under test from among those characters comprising the subgroup of characters identified by way of the feature analysis routine is completed; this being accomplished by means of a weighted matrix analysis. The processor functions to compare the informational content of corresponding bits of each of five masks, corresponding to the subgroup of characters identified by the feature analysis step, with the information stored in RAM 43 for the character under test.

Referring once more to FIG. 1B therein diagrammatically disclosed within the boundaries of rectangle 12 is the processor portion of the subject system. The processor 12 comprises an arithmetic unit 49 capable of performing the usual functions of addition, subtraction, multiplication, and division of two operand. For inputing the operand into the arithmetic unit 49, two registers 51 and 53 are provided. The registers 51 and 53 together with the arithmetic unit 49 are operatively connected to an addressable scratch pad memory 55. The scratch pad memory receives information from various portions of the processor 12 and serves as a temporary store to store the information currently being used by the arithmetic unit 49. Access to the plural locations of the scratch pad memory 55 is provided by means of an address register 56.

It should be understood that the processor 12 is under program control, the program itself being stored in a read only memory depicted in FIG. 1B as member 57. The details of the program are given below in terms of the flow chart of operations described thereby. For purposes of this explanation the program should be considered as a fixed routine, permanently stored in the read only memory of member 57 and accordingly, is a program of the type commonly referred to as "firm ware".

In addition to the arithmetic unit 49 an accumulator 59 is provided to perform a simultaneous compare operation on the information comprising the character under test with up to five weighted masks comprising the subgroup of characters identified in the feature analysis step. The information bits comprising the five weighted masks are derived from a matrix store 61. Read only memory devices in turn comprise the matrix store, of which each device contains a weighted mask. By means of a character subset register 63, which the program control 57 loads with character subset information in response to results established by feature analysis 45, as many as 5 read only memory devices are connected to the accumulator 59.

The operation of the processor 12 is best explained in terms of a flow chart depicting the various steps performed in the weighted matrix analysis operation. Accordingly, reference is now made to FIGS. 12A, 12B, and 12C. The accumulator 59 contains the results of the weighted matrix analysis and under the direction of program control 57 transfers the results of the comparison operation sequentially into the arithmetic unit 49 for a determination of the results and thereby the indentification of the character under test.

During the initial portion of an operative cycle, characterizing the operation of the processor 12, certain housekeeping functions are performed included among which is the loading of the character subset register 63 of FIG. 1B with information indentifying the particular subgroup of characters identified as a result of the feature analysis operation as most probably containing the character under test.

A second preliminary step is the loading of information into predetermined locations of the scratch pad memory 55. The following is a "map" of the scratch pad memory locations comprising the preferred embodiment of the present invention.

| SCRATCH PAD MEMORY MAP | |
|---|---|
| Address | Contents of Scratch Pad |
| 0000 | Character Code No. 1 |
| 0001 | Character Code No. 2 |
| 0010 | Character Code No. 3 |
| 0011 | Character Code No. 4 |
| 0100 | Character Code No. 5 |
| 0101 | Score Select Address |
| 0110 | Shift Select Address |
| 0111 | 2nd Best Character Code |
| 1000 | Best Character Code |
| 1001 | 2nd Best Score |
| 1010 | Best Score |
| 1011 | X = 4 |
| 1100 | Character Code Being Processed |
| 1101 | Delta Sum |
| 1110 | Reject Character Code |
| 1111 | |

The first five address locations contain information which identifies each of the five different characters comprising the sub-group idenfied by the feature analysis routine.

The starting address of information in the RAM 43 which is to be compared with information comprising the mask of each character in the subgroup is likewise stored in the scratch pad memory. It should be understood that the starting location of information in RAM, to be compared with respect to that of the five masks, may begin at any one of nine locations. This follows from the first that the total number of information bits comprising the EXTRATED VIDEO as stored in the RAM 43 exceeds the corresponding number of information bits comprising the masks of the subgroup of characters. This arrangement enables the storage of all of the bits of the characters to be used in the identification process. This information is contained in matrix form, the size of the matrix being 21 × 15 bits. The size of the mask is 19 × 13 bits. This means that there is a one bit border of information bits when any of the masks are symmetrically superimposed on the matrix. In the event that the best score achieved as a result of the comparison of the masks defining the subgroup of charaters selected by the feature analysis routine for a particular character under scan is not considered good enough to be determinative of the identity of the character under scan, i.e., is not exceed by a predetermined factor the second best score achieved for the comparison operation, the processor, under guidance of the program control 57, effects a shift in the starting location of the information contained in the RAM and repeats the comparison of the information bits with respect to corresponding bits of the five masks in an effort to determine whether a satisfactory difference exists with respect to the best score and the second best score. In this manner the starting location is shifted to each of the eight bit positions surrounding the initial starting bit and in the event a satisfactory difference between the best and second best score is not effected for any of the nine starting locations a REJECT CODE transfers to the interface for the particular character under scan.

Figure 12A:
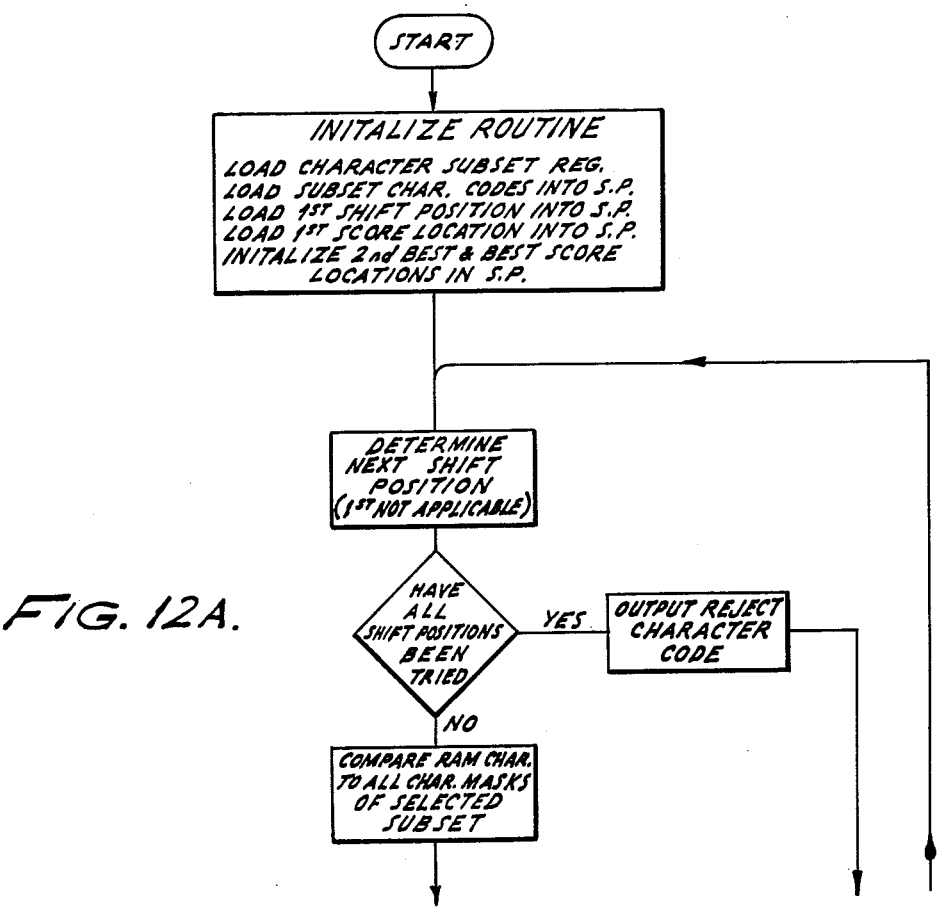
Figure 12B:
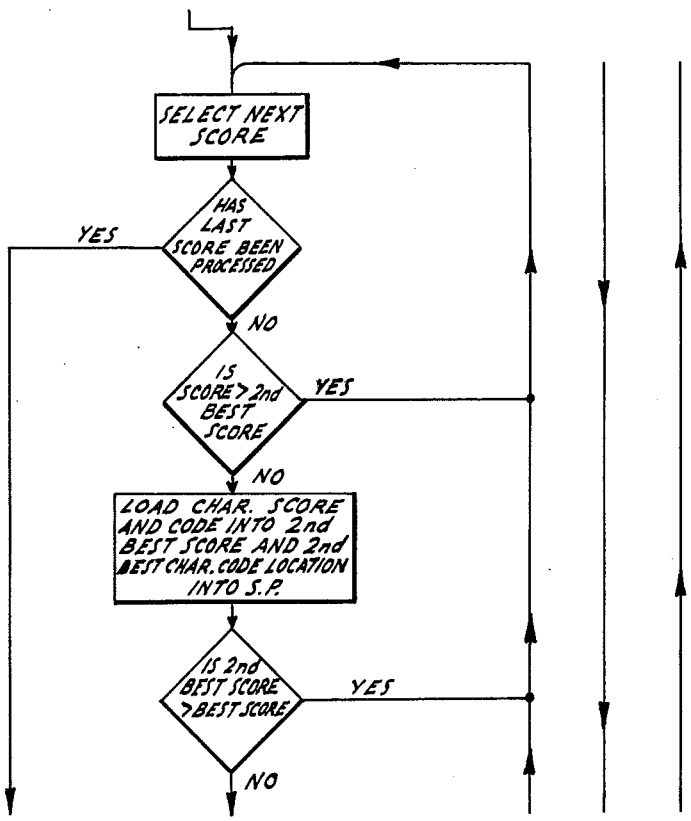
Figure 12C:
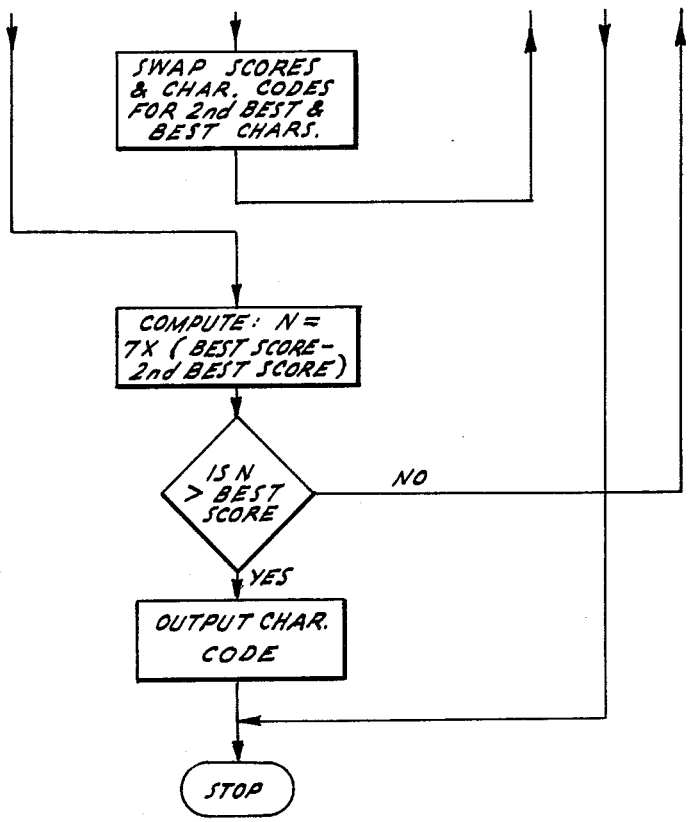

As will be seen from the further details of the aforementioned scratch pad memory map in company with the flow chart of FIGS. 12A, 12B, and 12C given below, the inforamtion defining the starting position during a particular comparison operation is stored in scratch pad memory address location 0110 of the scratch pad memory 55. The starting location for referencing the information contained in the RAM 43 at the commencement of the test operation will always be the same i.e., such that the masks to be compared will be symmetrically positioned with respect to the matrix of information bits comprising the character under test. For the 315 bit locations of the matrix, used to store the character under test in the preferred embodiment of the present invention, the starting location will always be memory 22 i.e., the second bit position of the second scan.

The next portion of the scratch pad memory 55 to be loaded by the program 57 in the initialized portion of the processing operation is the address location 1010 into which the best score is stored. As will be apparent from the explanation which follows the best score location of the scratch pad is initially made to register the worse possible score and similarly another portion of the scratch pad designed to store the second best score is initially loaded with the same bit configuration.

As will be seen from the further explanation of the operation of the process 12, the information defining the best score and second best score will be compared in the arithmetic unit 49 with the respective scores generated as the result of the comparison between each of the five masks and the information bits defining the character under test. Initially, the contents of the second best score address location 1001 are compared with one of the scores stored in the accumulator 59 and, since the information initially stored in the scratch pad memory address location identified in the scratch pad memory map as containing the second best score is initially the worse possible score, the initial comparison operation must be favorable to the score transferred from the accumulator since the latter score has to be lower. Accordingly, the score from the accumulator will be substituted for the contents of the second best score address location 1001 of the scratch pad. After a further comparison of the information just substituted into the second best score address location with the digital representation contained in the best score location of the scratch pad 55 (also initially containing the worse possible score) the contents of the second best address location will be interchanged with the scratch pad contents of the best score address location. Information stored in the other four registers of the accumulator 59 will similarly be compared with the contents of the second best address location and then with the contents of the best score address location after which a test will be made to determine whether the difference between the best score and the second best score exceed some predetermined minimum vlaue.

The score select address 0101 location of scratch pad 55 contains information defining the particular character code being processed, that is the identity of the character whose score is being compared with the second best and best scores. Location 1101 of the scratch pad memory stores the difference information between the best score and second best score. Additionally the constant "four" resides in the scratch pad at address location 1011. The constant "four" is used as a decrementing factor, the constant is instrumental in the computing of the next score to be processed and shift position to be used.

Upon completion of the housekeeping routine actual processing of the information bits defining the character under test commences.

In order to compare the information bits comprising the character under test with the corresponding bits of the five masks selected as a result of the feature analysis routine it is necessary to address the desired starting location of the information contained in the RAM 43. As indicated above, for the first comparison operation to be performed on a character under test the starting location corresponds to bit location 22 of the 315 position RAM. This address is established by referring to address location 0110 of the scratch pad memory. The addressing in turn is effected under program control. With the initial address established the respective information bits of the character under test are compared with corresponding information bits of all character masks of the subgroup of characters selected as a result of the features analysis routine. The information identifying the subgroup of characters has earlier been entered into address locations 0000, 0001, 0010, 0011, and 0100 of the scratch pad memory. The resultant comparison scores are retained in 5 separate registers of the accumulator 59. It should be noted that processing within the accumulator 59 is effected simultaneously with respect to all five masks. It should be also noted that before being restored in the scratch pad memory the shift select address location 0110 is automatically decremented such that in the event the criterion concerning the difference between the best and second best scored is not satisfied, the starting location for the first of eight successive scans of the information in the RAM will have been established.

Having now generated the scores for the five different masks, this information will now be sequentially tested against the information previously stored in the best and second best score address locations 1010 and 1001 respectively, of the scratch pad. The first score to be selected is that referred to as score number 5. It is compared with the score stored in the second best storage location of the scratch pad. As indicated above, the information initially stored in the second best score location of the scratch pad constitutes the results of a worse case analysis so that the comparison of the score in the fifth register of accumulator 59, with the second best score is bound to yield a negative result; i.e., the score in register 5 of the accumulator 59 will be lower, and hence better, than the previous contents of the second best score address location. Accordingly, the next step taken is to load the character score into the second best address 1001 location of the scratch pad and the corresponding code for that score into the second best character code address location 0111 of the scratch pad memory. The next step is to compare the information in the second best score address location 1001 of the scratch pad with the information presently in the best score address location 1010 of the scratch pad. Since initially the results stored in the best score location of the scratch pad constitutes the worst possible score a result of the comparison of the best score and second best score has the result of interchanging the information in the second best score with that in the best score location of the scratch pad and also interchanging the information from the second best character code address location 0111 of the scratch pad with that in the best character code address location 1000.

After testing of the score from register 5 of the accumulator 59 has been completed the score corresponding to accumulator location 4 is compared with the contents of the scratch pad memory address location containing the second best score, which at this time contains a worst score result. Accordingly, the score and the character code identyfying the score previously contained in register 4 of acculator 59 is transferred into the scratch pad as the second best score whereupon a determination is made as to whether the present second best score is greater than the best score. In the event the contents of the second best score address location is not greater than the contents of the best score address location, the contents of the best score address location and the second best score address location of the scratch pad memory are swappped as are the contents of the second best character code address location and the best character code address location.

Having completed the above, the program extracts the contents of the number 3 register of the accumulator 59 and compares it with the contents of the second best score address location and if the contents of the number 3 register of accumulator 59 is not greater than the second best score, an exchange occurs. This step is followed by a comparison of the contents of the second best score address location and the best score address location. The contents of the scratch pad memory are updated in accordance with such comparisons.

This procedure continues until the results corresponding to the first and second accumulator scores have been similarly processed and the best and second best scores have been established and the scratch pad mamory made to reflect such information.

After the contents of all five registers of the accumulator 59 have been compared with contents of the best score and second best score address locations of the scratch pad memory in the manner outlined above, the processor determines whether an acceptable difference exists between the best and second best scores. In the preferred embodiment of the present invention, a number referred to as DELTA SUM is determined as seven times the difference between the best and second best scores. It should be remembered that the lower the score the better the score. Thus, if the DELTA SUM yields an absolute value greater than the best score the identification of the character under test is said to have been successfully completed and the information identifying the character is outputed from said system via the output interface portion of the transport and interface logic 21.

In the event the determination of whether the DELTA SUM is greater than the best score is in the negative a jump occurs back into the initial portion of the program where the shift select information has been decremented such that a new comparison routine commences, wherein the starting location for extracting the information stored in the RAM will correspond to the address of one of the eight bit positions surrounding the initial starting position. The program is designed to automatically compare the information in the RAM that corresponding to each of the five masks for each of the eight surrounding bit positions. For each such bit position, the program steps are the same as those outlined above with respect to the original starting position. In the event that the difference criteria (that is whether seven times the difference between the best score and second best score is found to be greater than the best score) is satisfied then the search is terminated and the output character code is transmitted from address location 1000 of the scratch pad memory 55 to the transport and interface logic 21 and the search results are deemed to have been successfully established. In the event that all shift positions have been analyzed and the search criteria is still not satisfied a REJECT code is outputed from address location 1110 of the scratch pad memory 55 to inform the interface and transport logic that the effort to identify the character scan has been unsuccessful and at the same halt further operation of the program.

What is Claimed is:

1. An optical character recognition system comprising means for scanning a character under test for generating digital information signals corresponding to the presence or absence of information bits at predetermined positions along the scan path, means operatively connected to said scanning means and responsive to the presence of the predetermined number of information bits located at adjacent positions within an area of the character under test, means responsive to the output of said last named means to thereby select a subgroup of characters having a distribution of information bits in said selective areas corresponding in general to the distribution enjoyed by said character under test, and means for performing a weight matrix analysis on each character comprising said selected subgroup of characters whereby each bit position of each of the characters comprising the selected subgroup is compared with a corresponding one of said bit positions of said character under test.

2. The apparatus of claim 1 wherein means are provided to enable said weighted matrix analysis operation to be performed simultaneously on each character comprising said selected subgroup of characters.

3. The apparatus of claim 1 wherein means are provided to prepare the results obtained in said weighted matrix analysis operation to determine the best score and the second best score resulting from said weighted matrix analysis operation, and means to compare the difference between said best score and second best score to ascertain whether an acceptable result has been obtained.

4. The apparatus of claim 3 wherein means are provided to determine whether the difference between said best score exceeds by a factor of 7 the second best score and means responsive to a determination by said last named means that said best score does not exceed said second best score by a factor of 7 to repeat said weighted matrix analysis operation wherein the information bits comprising the character under test are shifted but one bit position relative to the corresponding bit position of the information bits comprising said subgroup of characters.

* * * * *